(12) United States Patent
Klaasen et al.

(10) Patent No.: US 12,338,135 B2
(45) Date of Patent: Jun. 24, 2025

(54) CONTINUOUS PROCESS FOR THE OXIDATIVE LEACHING OF NICKEL

(71) Applicant: Umicore, Brussels (BE)

(72) Inventors: Bart Klaasen, Olen (BE); Marjon Willekens, Olen (BE)

(73) Assignee: UMICORE, Brussels (BE)

( * ) Notice: Subject to any disclaimer, the term of this patent is extended or adjusted under 35 U.S.C. 154(b) by 0 days.

(21) Appl. No.: 18/842,091

(22) PCT Filed: Mar. 2, 2023

(86) PCT No.: PCT/EP2023/055283
§ 371 (c)(1),
(2) Date: Aug. 28, 2024

(87) PCT Pub. No.: WO2023/166118
PCT Pub. Date: Sep. 7, 2023

(65) Prior Publication Data
US 2025/0109038 A1    Apr. 3, 2025

(30) Foreign Application Priority Data
Mar. 3, 2022   (EP) .................................. 22159893

(51) Int. Cl.
*C01G 53/10*   (2006.01)
(52) U.S. Cl.
CPC .................. *C01G 53/10* (2013.01)

(58) Field of Classification Search
CPC ...................................................... C01G 53/10
USPC ...................................................... 423/150.1
See application file for complete search history.

(56) References Cited

U.S. PATENT DOCUMENTS 7,364,717 B2    4/2008   Fierro et al.

FOREIGN PATENT DOCUMENTS

| CN | 214552594 U | 11/2021 |
| JP | H0892794 A | 4/1996 |
| JP | 2011126757 A | 6/2011 |
| WO | 2021105365 A1 | 6/2021 |

OTHER PUBLICATIONS

ISA/EPO: International Search Report and Written Opinion for International Application No. PCT/EP2023/055283, mailed Jun. 19, 2023, 9 pages.
Bilczuk, D., et al., "Kinetic study of the dissolution of metallic nickel in sulphuric acid solutions in the presence of different oxidants" The Canadian Journal of Chemical Engineering, vol. 94, Issue 10, Oct. 2016, pp. 1872-1879.

*Primary Examiner* — Melissa S Swain
(74) *Attorney, Agent, or Firm* — NK Patent Law

(57) ABSTRACT

The present invention provides a process for the preparation of a nickel sulphate solution in a column reactor, whereby metal particles containing nickel are reacted with an oxidative leach solution comprising sulphuric acid and hydrogen peroxide in water and whereby the acid in the oxidative leaching solution is substantially depleted.

16 Claims, 2 Drawing Sheets

CONTINUOUS PROCESS FOR THE OXIDATIVE LEACHING OF NICKEL

CROSS REFERENCE TO RELATED APPLICATIONS

This application is a U.S. National Stage Application of International Patent Application No. PCT/EP2023/055283, filed on Mar. 2, 2023, which claims priority to European Patent Application No. 22159893.1, filed on Mar. 3, 2022.

TECHNICAL FIELD

The present invention relates to a process for manufacturing nickel sulphate.

INTRODUCTION

Secondary lithium-ion batteries (LIB) have found widespread application in portable devices and electric vehicles, as well as in specialized aerospace applications. Important characteristics of reusable batteries include charge/discharge efficiency, cycle durability, energy density and safety. Many developments have focused on improving the performance of the cathode of the LIB.

Next to lithium cobalt oxide, lithium manganese oxide and lithium iron phosphate, lithium nickel manganese cobalt oxide ("NMC", $LiNi_xMn_yCo_zO_2$) and lithium nickel cobalt aluminium oxide ("NCA", $LiNi_xCo_yAl_zO_2$) have received a lot of attention due to their superior performance. They can be easily obtained from mixing a suitable mixed metal precursor with a suitable lithium compound, and subsequent heat treatment of the mixture. Further processing steps are widely reported, e.g. for doping with further elements, providing a surface coating, improving crystallite size, etc.

The rising demand for electric vehicles (EV) has led to an increased demand for high purity nickel, especially for high purity nickel sulphate. Effectively, nickel refineries for preparing high purity nickel are considered of paramount importance for the supply of battery materials in the next decade. Such nickel refineries will need to allow for high capacities and high efficiency of the processes to yield the desired nickel sulphate in a desired quantity and high purity. Therefore, novel processes need to be developed and optimized. Amongst other processes, the oxidative leaching of Ni from a high purity nickel metal is considered one of the more promising routes.

Processes for the leaching of Ni metal in sulphuric acid in presence of hydrogen peroxide proceed according to the reaction:

$$Ni+H_2O_2+H_2SO_4 \rightarrow NiSO_4+2H_2O$$

This process is also known as oxidative leaching of Ni metal, a process which is highly exothermic (−423 kJ/mol).

WO 2021/105 365 describes a process for manufacturing nickel sulphate by leaching metal particles comprising nickel in an aqueous sulphuric acid solution, said process comprising the steps of:—introducing the metal particles in the aqueous sulphuric acid solution—introducing an aqueous hydrogen peroxide solution in the aqueous sulphuric acid solution containing the metal particles wherein the aqueous hydrogen peroxide solution is introduced progressively into the aqueous sulphuric acid solution containing the metal particles. Yet, novel processes are in demand to provide new processes which allow for ease of operation, high throughput, and optimized use of reactants. JP 2011/126757 describes a method for producing a nickel sulphate aqueous solution with a low content of free sulfuric acid. The method includes filling metal nickel masses in a metal dissolution column, feeding heated sulfuric acid from the upper part of the metal dissolution column and at the same time feeding air or oxygen from the lower part of the metal dissolution column. Such processes may, however, suffer from entrainment of non-reacted metal fines in the resulting process output.

SUMMARY

The current invention provides in a solution for at least one of the above mentioned problems by providing a process for the oxidative leaching of Ni according to claim 1. Preferably, the process is performed under continuous flow conditions in a column reactor whereby the acid concentration in the oxidative leaching solution is substantially depleted. More specifically, the acid in the oxidative leaching solution is depleted to the extent that the temperature of the obtained nickel sulphate solution increased to a temperature just below the boiling point of the solution. The inventors have found that under such conditions, the conversion rate of Ni to nickel sulphate is maximized, and accordingly also the capacity of the column. The inventive process is schematically shown in FIG. 1.

DESCRIPTION OF THE FIGURES

By means of further guidance, figures are included to better appreciate the teaching of the present invention. Said figures are intended to assist the description of the invention and are nowhere intended as a limitation of the presently disclosed invention.

The figures and symbols contained therein have the meaning as commonly understood by one of ordinary skill in the art to which this invention belongs.

DETAILED DESCRIPTION OF THE INVENTION

Figure 1:
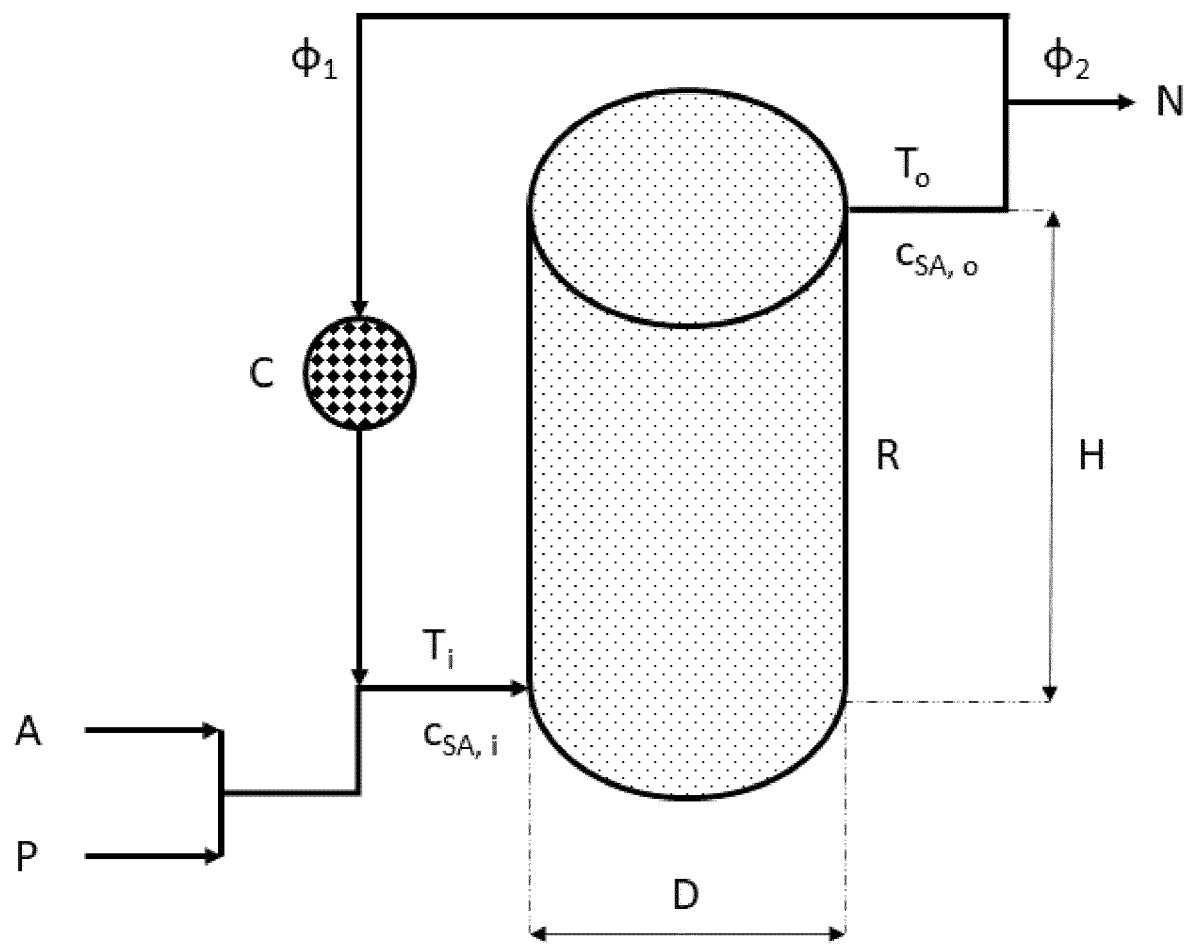
FIG. 1 shows schematically a process according to the invention in a column reactor.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention. As used herein, the following terms have the following meanings:

"A", "an", and "the" as used herein refers to both singular and plural referents unless the context clearly dictates otherwise. By way of example, "a compartment" refers to one or more than one compartment.

"About" as used herein referring to a measurable value such as a parameter, an amount, a temporal duration, and the like, is meant to encompass variations of +/−20% or less, preferably +/−10% or less, more preferably +/−5% or less, even more preferably +/−1% or less, and still more preferably +/−0.1% or less of and from the specified value, in so far such variations are appropriate to perform in the disclosed invention. However, it is to be understood that the value to which the modifier "about" refers is itself also specifically disclosed.

"Comprise," "comprising," and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

The recitation of numerical ranges by endpoints includes all numbers and fractions subsumed within that range, as well as the recited endpoints. All percentages are to be understood as percentage by weight, abbreviated as "wt. %" or as volume percent, abbreviated as "vol. %", unless otherwise defined or unless a different meaning is obvious to the person skilled in the art from its use and in the context wherein it is used.

In the context of the present invention, the term "continuous process" is to be considered as a process in which the produced solution has a substantially constant composition. Specifically, a continuous process is a process in which the produced solution has a constant composition within the range of what are considered normal process variations. Also, it is envisaged that liquid reagents which are fed to the reactor have a fixed composition under normal process conditions. More specifically, the produced solution has a composition whereby the concentration of each ingredient is within the range of +/−20% or less, preferably +/−10% or less, more preferably +/−5% or less, even more preferably +/−3% or less of its average concentration. In a preferred embodiment, the present invention provides a continuous process which operates under steady-state conditions.

Preferably, sulphuric acid and hydrogen peroxide are fed to the process according to the present invention at a substantially constant concentration and flow rate. Ni metal may be fed to the process intermittently or gradually. Preferably, the present invention provides a process, preferably a continuous process, wherein the bed volume of metal particles containing nickel is controlled in a column reactor within the range of +/−20% or less, preferably +/−10% or less, more preferably +/−5% or less, even more preferably +/−3% or less of its average bed volume.

In the context of the present invention, the term "concentrated nickel sulphate solution" is to be considered as synonymous to the term "nickel sulphate solution having a nickel content of at least 60 g Ni/L," optionally comprising further contents, such as sulphuric acid in an amount of less than 30 g/L $H_2SO_4$, preferably less than 20 g/l and more preferably less than 10 g/L. Preferably, said nickel sulphate solution has a nickel content of at least 60 g Ni/L, and preferably at least 80 g Ni/L. Said nickel sulphate solution preferably has a content of nickel sulphate below the saturation point of nickel sulphate at the processing temperature, i.e. at a temperature of about 90° C. or of about 95° C. Preferably, said nickel sulphate solution has a Ni content between 80 and 200 g Ni/L, preferably between 90 and 175 g Ni/L and more preferably between 100 and 150 g Ni/L. Preferably, said nickel sulphate solution obtained from the oxidative leaching reaction is a nickel sulphate solution having a nickel content of between 110 and 140 g/L, more preferably between 120 and 140 g/L, and most preferably said nickel sulphate solution having a nickel content of about 130 g/L.

In a first aspect, the present invention provides a process for the preparation of a nickel sulphate solution in a column reactor by oxidative leaching of metal particles containing nickel. The column reactor has a feed section at the bottom of said reactor, an outflow or overflow section at the upper end or top end of said reactor, and a reaction section between said feed section and said overflow section. Said process comprises the steps of:
  i. feeding metal particles containing nickel to the reaction section of said column reactor;
  ii. feeding an oxidative leach solution comprising sulphuric acid and hydrogen peroxide in water via the feed section to said reaction section, thereby contacting said oxidative leach solution with said metal particles containing nickel in said reaction section, thereby obtaining a nickel sulphate solution comprising a residual amount of sulphuric acid ($C_{SA,o}$); and
  iii. evacuating said nickel sulphate solution from said overflow section of the column reactor.

Preferably, the process according to the first aspect of the invention is a continuous process. Preferably, the process according to the first aspect of the invention is applied for preparing a concentrated nickel sulphate solution. The process is typically performed under continuous flow conditions in a column reactor and in that the acid in the oxidative leaching solution is substantially depleted after passage through the column reactor. Specifically, steps ii. and iii. are typically performed under continuous flow conditions, while step i. can be performed under continuous flow conditions or can be performed gradually or intermittently. More specifically, the acid in the oxidative leaching solution is depleted to the extent that the temperature of the obtained nickel sulphate solution increased to a temperature just below the boiling point of the solution, and to ensure that the capacity of the column is maximized for a targeted acid concentration in the nickel sulphate solution at the top of the reactor. The inventors have found that under such conditions, the conversion of Ni to nickel sulphate is maximized, and accordingly also the capacity of the column is maximized.

The depletion of sulphuric acid over the column reactor is expressed by the ratio of the sulphuric acid concentration ($C_{SA,o}$) of the nickel sulphate solution obtained in step ii. to the sulphuric acid concentration ($C_{SA,i}$) of said oxidative leach solution which is fed to the reactor. In the scope of the present invention, the inventors recommend that said ratio is maintained at a value between 0.90 and 0.01, preferably between 0.80 and 0.01, and more preferably between 0.70 and 0.02. In the context of the present invention, this ratio is referred to as "acid ratio."

FIG. 1 shows schematically a process according to the invention in a column reactor.

The inventors have found that a desired, i.e. a sufficiently low, acid ratio can be managed by maintaining a sufficiently low flow rate of the oxidative leach solution through the column reactor.

The inventors have found that the process in the column reactor is more easily controlled at lower flow rates for the oxidative leach solution through said column reactor. Maintaining a sufficiently low flow rate of said oxidative leach solution results in the depletion of sulphuric acid at the top of said column reactor. Also, a sufficiently low flow rate of said oxidative leach solution to said column reactor allows to control the leaching reaction such that the temperature of the nickel sulphate solution at the top of the column reactor remains below the boiling point of the solution, while the inlet temperature can be kept moderate to low. A sufficiently low flow rate allows to control the progress of the leaching reaction to ensure complete consumption of the oxidizing agent and is preferably managed to result in a temperature at the top of the column which is just below the boiling point of the solution. Importantly, the inventors realized that operating the process in the column reactor at a sufficiently low flow rate, results in a higher average acid concentration in the column reactor, and consequently a faster conversion of Ni metal to $NiSO_4$.

Figure 2:
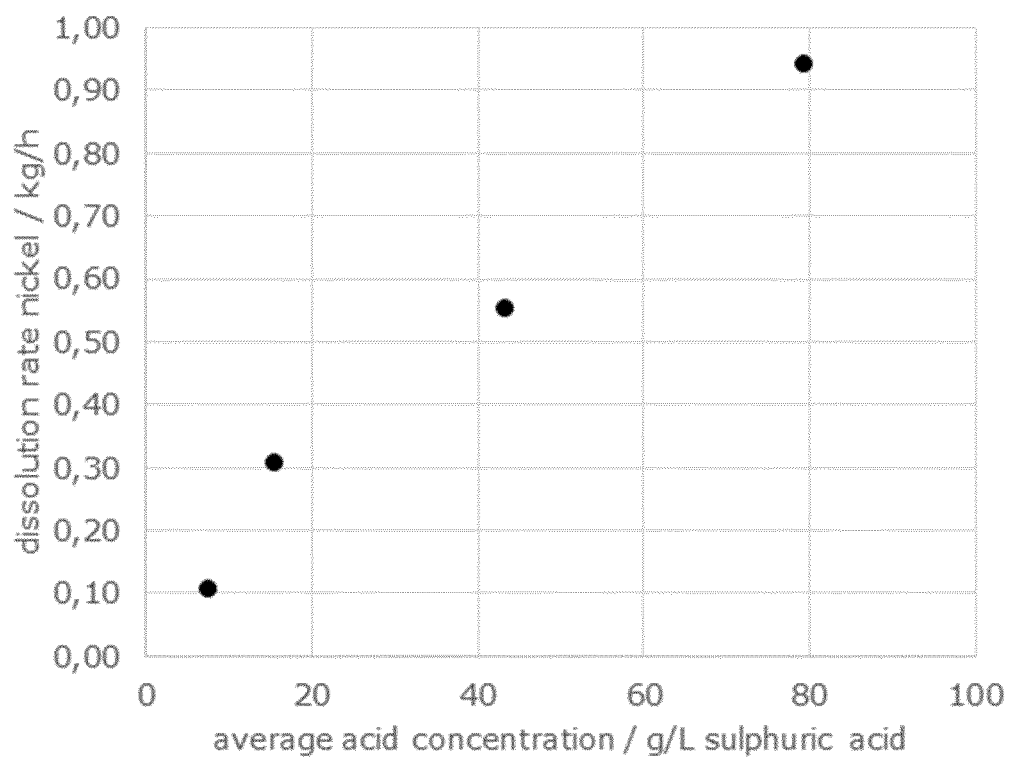
FIG. 2 shows the dissolution rate for nickel (Y-axis, kg/h) in an oxidative leaching process according to the inventive process, as a function of the average acid concentration (X-axis, g/L sulphuric acid, calculated as the average of 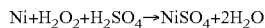 $C_{SA,\,i}$ and $C_{SA,\,o}$) at a constant volumetric flow rate through a column.

FIG. 2 shows the dissolution rate for nickel (Y-axis, kg/h) in an oxidative leaching process according to the inventive process, as a function of the average acid concentration (X-axis, g/L sulphuric acid, calculated as the average of $C_{SA,i}$ and $C_{SA,o}$) at a constant volumetric flow rate through the column. The results show that the nickel dissolution rate increases with higher average acid concentration in the column. A maximum capacity for a continuous process can be obtained at maximum consumption of the acid over the column, provided that the temperature at the top of the column reactor is controlled to a temperature below the boiling temperature of the nickel sulphate solution.

On the other hand, processes which operate with higher ratios of the sulphuric acid concentration of said nickel sulphate solution obtained in step ii. to the sulphuric acid concentration of said oxidative leach solution, such as ratios between 0.95 and 1.0, operate at higher flow rates which inevitably result in a lower average acid concentration in the reaction zone. Accordingly, such processes experience a slower conversion of the Ni metal to $NiSO_4$, and a lower capacity.

In a preferred embodiment, the present invention provides a process according to the first aspect, whereby, on a macroscopic scale, a 1D flow profile is maintained throughout the column.

In a preferred embodiment, the present invention provides a process according to the first aspect, whereby the acid ratio, i.e. the ratio of the sulphuric acid concentration ($C_{SA,o}$) of said nickel sulphate solution obtained from the column reactor to the sulphuric acid concentration ($C_{SA,i}$) of the oxidative leach solution which is fed to the column reactor, is lower than 0.70, lower than 0.65, lower than 0.60, lower than 0.55, or even lower than 0.50. Preferably, said ratio is between 0.5 and 0.1. Preferably, said ratio is lower than 0.45 and even lower than 0.40. Preferably, said ratio is higher than 0.05. Most preferably, said ratio is about 0.10, about 0.15, about 0.20, about 0.25, 0.30, about 0.35 or any value there in between.

In a preferred embodiment, the present invention provides a process according to the first aspect, whereby the difference $\Delta_{ac}$ in acid concentration $C_{SA,i}$ and $C_{SA,o}$ is at least 5 g/L sulphuric acid and at most 80 g/L sulphuric acid, preferably at least 10 g/L sulphuric acid and at most 70 g/L sulphuric acid. Preferably, said difference $\Delta_{ac}$ in acid concentration is at least 15 g/L or more preferably at least 20 g/L. Preferably, said difference $\Delta_{ac}$ in acid concentration is at most 60 g/L or at most 50 g/L and more preferably at most 45 g/L. Most preferably, said difference $\Delta_{ac}$ in acid concentration is about 15 g/L, 20 g/L, 25 g/L, 30 g/L, 35 g/L, 40 g/L or 45 g/L, or any value there in between.

In a preferred embodiment, the oxidative leaching process, i.e., the column reactor, is controlled to ensure that the nickel sulphate solution obtained from said column reactor has a residual sulphuric acid content ($C_{SA,o}$) of between 1 g/L and 20 g/L. Leaching to a lower residual sulphuric acid content ensures that sulphuric acid is used economically in the process. Preferably, the residual amount of sulphuric acid in said nickel sulphate solution is between 2 g/L and 15 g/L, more preferably between 2 g/L and 10 g/L, and most preferably the residual amount of sulphuric acid is about 2 g/L, 4 g/L, 6 g/L, 8 g/L or 10 g/L, or any value there in between.

In a preferred embodiment, the present invention provides a process according to the first aspect, whereby said oxidative leach solution is fed to said reactor, i.e., said column reactor, at a temperature above 20° C., preferably above 30° C., preferably above 40° C. and more preferably above 50° C. Specifically, said oxidative leach solution is fed to said reactor at a temperature of 50° C. to 85° C., preferably at a temperature between 65° C. and 85° C., more preferably at a temperature of about 75° C. It is advantageous to provide a cooler oxidative leach solution to the column, to allow for a higher concentration of acid. Such a higher concentration of acid would allow for a higher conversion of Ni and thus a higher capacity of the process. However, the inventors realized that it is opportune to maintain a sufficiently high temperature of the oxidative leaching solution entering the column, to ensure sufficiently fast reaction kinetics of the oxidative leaching reaction. A desired temperature, e.g. 60° C., can be achieved by mixing sulphuric acid and/or hydrogen peroxide at room temperature with a partially cooled fraction of the effluent of the column. Furthermore, maintaining a sufficiently high temperature allows for an efficient cooling operation of said fraction of the effluent. Feeding of an oxidative leach solution at a lower temperature also ensures that decomposition of hydrogen peroxide in the feed solution is suppressed.

In a preferred embodiment, the present invention provides a process according to the first aspect, whereby said nickel sulphate solution is removed from said reactor at a temperature below the boiling temperature of said nickel sulphate solution, preferably at a temperature of 90° C. to 105° C., more preferably at a temperature between 95° C. and 100° C. Preferably, said nickel sulphate solution which is evacuated from the reactor has a temperature of 95° C. to 99° C., such as 96° C., 97° C., 98° C. or 99° C.

In a preferred embodiment, the present invention provides a process according to the first aspect, whereby a first fraction $\varphi_1$ of said nickel sulphate solution is cooled from a temperature above 90° C. to a temperature below 85° C., and whereby said fraction $\varphi_1$ is mixed with sulphuric acid and hydrogen peroxide in water to form an oxidative leach solution, prior to feeding said oxidative leach solution to said reactor. Preferably, said first fraction $\varphi_1$ is cooled from a temperature above 95° C. to a temperature below 85° C., preferably to a temperature below 80° C., more preferably to a temperature below 75° C., and even more preferably to a temperature below 70° C., more preferably from a temperature above 97° C. to a temperature below 85° C. Advantageously, said first fraction $\varphi_1$ is cooled to a temperature above 50° C., preferably above 60° C., and more preferably above 70° C.

Cooling may proceed in a heat exchanger such as a plate heat exchanger, a shell-and-tube heat exchanger, or in a reactor with cooling means. Preferably, said heat exchanger consists of a reactor with cooling means. Such reactors additionally allow for buffering a volume of said first fraction $\varphi_1$. Alternatively, sulphuric acid and/or hydrogen peroxide can be pre-heated with the heat which is recovered from the heat exchanger. Advantageously, the process conditions according to the inventive process ensure that a constant temperature of the nickel sulphate solution at the top of the column reactor is realized, which allows for a straightforward cooling process.

In a preferred embodiment, the present invention provides a process according to the first aspect, whereby a first fraction $\varphi_1$ of said nickel sulphate solution is mixed with sulphuric acid and/or hydrogen peroxide to form an oxidative leach solution, prior to feeding said oxidative leach solution to said reactor. In a preferred embodiment, the volumetric ratio of said first fraction $\varphi_1$ to the total volume of said nickel sulphate solution is between 0.70 and 0.98, preferably between 0.75 and 0.95, more preferably between 0.80 and 0.93 and most preferably is equal to 0.80, 0.82, 0.84, 0.86, 0.88, 0.90, 0.92 or any value there in between.

In a preferred embodiment, the present invention provides a process according to the first aspect, whereby heat recovered from the cooling step of said first fraction $\varphi_1$ is, at least in part, used for heating the oxidative leach solution and/or the content of said reactor. Preferably, said heat is used for heating the oxidative leach solution and/or the content of said reactor to a temperature of between 55° C. and 85° C., preferably to a temperature between 60° C. and 85° C., more preferably to a temperature between 65° C. and 80° C., most preferably at a temperature of about 65° C.

In a preferred embodiment, the present invention provides a process according to the first aspect, whereby a second fraction $\varphi_2$ of said nickel sulphate solution is subjected to a purification step to reduce the concentration of one or more impurities in said second fraction $\varphi_2$, whereby said impurities comprise one or more selected from the list comprising Cu, Zn, Co, Mn, Fe, Al, F, C, Ca, Si, P, As, Cd, Sb and Mg. In a preferred embodiment, a base is added to said second fraction $\varphi_2$ of said nickel sulphate solution to react with the residual amount of sulphuric acid present in said nickel sulphate solution, prior to subjecting said second fraction to a further purification step, whereby said base is selected from the group consisting of potassium hydroxide, potassium carbonate, nickel hydroxide, nickel carbonate, cobalt hydroxide, cobalt carbonate, manganese hydroxide, manganese carbonate, calcium hydroxide, calcium carbonate, sodium hydroxide, sodium carbonate, lithium hydroxide, lithium carbonate, magnesium oxide, magnesium hydroxide, magnesium carbonate, or a combination of two or more of the aforementioned. Preferably, said base is added until the pH of the nickel sulphate solution is between 2 and 5, preferably between 2.5 and 4.5, and more preferably between 3.0 and 4.0.

In a preferred embodiment, the present invention provides a process according to the first aspect, whereby said metal particles containing nickel comprise nickel in an amount of at least 97 wt. %, relative to the total weight of said metal particles, preferably at least 98 wt. % and more preferably at least 99 wt. %. Said metal particles may further contain Co in an amount of up to 1 wt. %. Preferably said metal particles contain Ni in an amount of at least 99.5 wt. %. In the context of the present invention, the Ni metal feed preferably comprises highly pure Ni metal, having a purity of typically 99.97+%, 99.98+%, or even 99.99+%. The Ni metal may be fed to the reactor in the form of Ni cut cathode metal, having a size of typically 1"×1", 2"×2" or 4"×4", a shredded or cut full plate cathode metal obtained from an electrowinning process; Ni metal rounds; or Ni pellets, balls having diameter of about 0.5 cm. Hydrogen peroxide used in the process is typically a 30 to 60 wt. %, such as 50 wt. % solution in water and sulphuric acid has a concentration of 78 to 98 wt. % in water, preferably a 98 wt. % concentration in water. Any water used in the process may be high purity water, such as demineralized water or RO water.

In a preferred embodiment, the present invention provides a process according to the first aspect, whereby said oxidative leach solution comprises sulphuric acid in an amount of 10 to 150 g/L, preferably in an amount of 15 to 100 g/L.

Preferably, said oxidative leach solution comprises sulphuric acid in an amount of 20 to 80 g/L, more preferably in an amount of 20 g/L to 60 g/L.

In a preferred embodiment, the present invention provides a process according to the first aspect, whereby said oxidative leach solution comprises hydrogen peroxide in an amount of 1 to 50 g/L, preferably 1 to 30 g/L, and more preferably in an amount of 5 to 30 g/L. More preferably, said oxidative leach solution comprises hydrogen peroxide in an amount of 5 to 20 g/L, more preferably in an amount of about 5 to 12 g/L, and even more preferably in an amount of about 7 to 10 g/L.

In a first preferred embodiment, the present invention provides a process according to the first aspect, whereby hydrogen peroxide is present in the oxidative leach solution which is fed to the column reactor in a sub-stoichiometric amount relative to the amount of sulphuric acid present in said oxidative leach solution. E.g., the oxidative leach solution may comprise 0.4 mol/L hydrogen peroxide and 0.5 mol/L sulphuric acid. Preferably, the molar ratio of hydrogen peroxide to sulphuric acid in the oxidative leach solution which is fed to the column reactor is between 0.6 and 1.0, preferably between 0.8 and 1.0, and more preferably is about 0.9. Processes according to the invention allow to operate with a sub-stoichiometric amount of hydrogen peroxide, whereby a residual amount of sulphuric acid in the formed nickel sulphate solution is allowed. In a second, alternative embodiment, the present invention provides a process according to the first aspect, whereby sulphuric acid and hydrogen peroxide are present in a stoichiometric amount in said oxidative leach solution. Preferably, the molar ratio of sulphuric acid to hydrogen peroxide is between 1:1 and 1:1.2, more preferably between 1.0:1.0 and 1:1.1. An excess of hydrogen peroxide supports further depletion of the sulphuric acid. An excess of hydrogen peroxide ensures that hydrogen peroxide is not the rate limiting factor for the process. Excess hydrogen peroxide can be recovered from the column reactor effluent.

In a preferred embodiment, the present invention provides a process according to the first aspect, whereby a gaseous atmosphere in the overflow section of said column reactor is circulated through a scrubber. Preferably, said scrubber is cooled. Preferably, said scrubber and circulation reactor are integrated in one single unit. Preferably, said circulation reactor is maintained at a temperature between 50° C. and 90° C., preferably at a temperature of about 65° C. or about 85° C., and more preferably at a temperature of about 75° C. Lower temperatures favour the efficiency of the scrubbing operation.

In a preferred embodiment, the present invention provides a process according to the first aspect, whereby said oxidative leach solution is contacted with said metal particles at atmospheric pressure, i.e. 1 bar, or at an under-pressure of less than 0.5 bar, preferably less than 0.2 bar, and more preferably less than 0.1 bar. Preferably, said oxidative leach solution is contacted with said metal particles under an atmosphere of oxygen, air or oxygen-enriched air. In another preferred embodiment, the gaseous atmosphere in the overflow section is flushed with an inert gas, such as $N_2$. This allows for a straightforward removal of hydrogen gas, in case hydrogen gas is formed in the column reactor.

In another preferred embodiment, the present invention provides a process according to the first aspect, whereby the gaseous atmosphere in the overflow section is treated in a scrubber to remove water and any hydrogen that may have formed.

In a preferred embodiment, the present invention provides a process according to the first aspect, whereby a bed volume consisting of said metal particles in the column reactor has a diameter $D_b$ and a height $H_b$, whereby the ratio of said height to said diameter $H_b:D_b$ is between 0.8 to 5, preferably between 1 and 5. Preferably, the height and diameter of said bed volume are maintained substantially constant throughout the process.

The inventive process proceeds in a column. In the context of the present invention, the term "column" is to be considered equivalent to the term "column reactor", "packed bed" or "packed bed reactor", "tower" or "tower reactor" and refers to a column reactor having a substantially cylindrical form having an internal diameter D and a height H. The column reactor consists of a vertically-arranged cylindrical column and is arranged to operate without mechanical agitation, preferably in the upflow mode, i.e. fluid flow from bottom to top of the column. The column reactor is further characterized by (i) a feed section at the bottom of said cylindrical reactor for feeding liquid reagents such as an aqueous solution comprising sulphuric acid and hydrogen peroxide; (ii) a top section or an overflow section at the upper part or top end of the column reactor, at the opposite side of the feed section, characterized by an effluent for collecting the overflowing nickel sulphate solution; (iii) a middle section or a reaction section in the middle of said cylindrical reactor, where the leaching reaction proceeds. Metal particles comprising nickel are preferably fed at the top of the reactor and may be dosed gradually or intermittently to form a bed of metal particles on a support in said column reactor. Said column reactor preferably comprises a support above the feed section for supporting a solid reagent such as Ni metal. Said support consists of a grid for supporting the Ni metal. Further, the column reactor is preferably equipped with means to feed a solid reagent such as Ni metal to the reaction zone of the column reactor. Further, the column reactor is preferably also equipped with means for radially and uniformly distributing the oxidative leach solution in the feed section of the column reactor. The solid reagent can be dosed on the support by introduction of the Ni metal at the top of the reactor, or at any position above the support. The overflow zone is provided with an outlet to receive a nickel sulphate solution via an overflow mechanism.

In a preferred embodiment, the present invention provides a process according to the first aspect of the invention, whereby a liquid volume consisting of said oxidative leach solution in said column reactor has a diameter $D_L$ and a height $H_L$, whereby the ratio of said height to said diameter $H_L:D_L$ is between 1.0 and 10.0, preferably between 1.5 and 8.0, more preferably between 2.0 and 5.0 and most preferably about 2.0, 2.5, 3.0, 3.5, 4.0, 4.5 or 5.0, or any value there in between. A proper geometry of the liquid volume in the column reactor, especially a sufficiently high ratio $H_L:D_L$ ensures that a 1-dimensional flow can be obtained throughout the column; and that small metallic particles resulting from reacted metallic feed particles are not upwardly entrained with the nickel sulphate solution resulting from the oxidative leaching reaction, thereby entraining unreacted metal particles and thereby contaminating the obtained nickel sulphate solution, as well as lowering the efficiency of the process.

In a preferred embodiment, said column reactor is cylindrically shaped and has an internal diameter D and a height H, whereby the ratio of said height H to said diameter D is significantly higher than 1, such as between 1.0 and 10.0, preferably between 1.5 and 8.0, more preferably between 2.0 and 5.0 and most preferably about 2.0, 2.5, 3.0, 3.5, 4.0, 4.5 or 5.0, or any value there in between. A proper geometry of the column reactor, especially a sufficiently high ratio H:D ensures that a 1-dimensional flow can be obtained throughout the column.

In a preferred embodiment, the present invention provides a process according to the first aspect of the invention, whereby said oxidative leach solution comprising sulphuric acid and hydrogen peroxide in water is fed in step ii. via a bottom section of said column reactor to said reaction section, and whereby said nickel sulphate solution is evacuated in step iii. via a top section of said column reactor from said reaction section. Preferably, said metal particles are fed via a top section of said column reactor to the reaction zone. Said metal particles may be fed continuously or intermittently, preferably intermittently.

In a preferred embodiment, said reaction zone may also incorporate a mechanical impeller, i.e. an impeller that is attached to a motor by means of a rod for the purpose of solely mixing liquid reagents. Alternatively, a static mixer is used. In a preferred embodiment, the reaction zone comprises a plurality of vertical baffles placed diametrically opposite to each other and placed at a position between said inlet nozzles and the said impeller such that at least one baffle is placed on diametrically opposite ends of the reactor walls. In this embodiment, the impeller and the vertical baffles help in micro-level mixing of the reactants. The impeller improves reactor kinetics. The vertical baffles contribute towards ensuring the maximum mixing of the reactants within the reaction zone. The placement of the vertical baffles ensures that the reaction is limited to the reaction zone and does not extend into the zones above the reaction zone.

Preferably, said reactor has a calming zone above the reaction zone. The calming zone has a tubular structure with a constant cross section, preferably equal to that of said reaction zone, or with a widening cross section whereby the diameter of said cross section is larger than the cross section of the reaction zone. The calming zone is in fluid communication with said reaction zone and has the reaction zone at its distal end and the overflow zone at its proximal end. The function of the calming zone is to achieve a non-turbulent liquid flow in which unreacted metal fines adapt a nonfluidised condition. This allows the unreacted or insufficiently reacted metal particles to return to the reaction zone. The calming zone may comprise a plurality of horizontal baffles placed in the central, proximal, and distal parts of the calming zone. In this embodiment, at least two of the provided horizontal baffles may be downward type of baffles with a centre flow aperture adapted to slow down the speed of the reactant mixture. In yet another embodiment, the provided central horizontal baffle is a conical type baffle with annular flow. In this embodiment, the placement of the horizontal baffles creates a curved flow path that allows for particles of a large size to settle down, while at the same time, allowing the upward flowing mixture to travel smoothly into the overflow zone.

In a preferred embodiment, the overflow zone has a tubular structure, with a cross section equal to that of the calming zone and the reaction zone, and is placed at the proximal end of the reactor. The overflow zone is provided with an outlet to receive the formed nickel sulphate solution.

EXAMPLE

The following example is intended to further clarify the present invention, and is nowhere intended to limit the scope of the present invention.

Example 1

FIG. 1 shows schematically a process according to the invention in a column reactor. An oxidative leach solution is prepared by mixing an aqueous sulphuric acid solution A with a hydrogen peroxide solution P in water. The mixture is subsequently heated to about $T_i=60°$ C. by mixing with a fraction $\varphi_1$ of the effluent of the column reactor. The column reactor has an internal diameter D and a height H, whereby the ratio H:D is about 2.35. Before mixing said fraction $\varphi_1$ with sulphuric acid and hydrogen peroxide, said fraction $\varphi_1$ is cooled from a temperature of about 98° C. to a temperature of about 65° C. The oxidative leach solution prepared accordingly has a temperature of about 60° C. and has a sulphuric acid content of about 45 g/L, and is fed via a feed section to the reaction zone of the column reactor.

The reaction zone comprises Ni metal cut cathodes having a dimension of about 50 mm by 50 mm and having a nickel content of 99.97%. The metal particles containing nickel are intermittently fed on the support plate above the reactor feed section; metal particles feed omitted in FIG. 1. The Ni metal is provided in a bed, said bed having a bed volume characterized by a height and diameter, whereby the ratio of said height to said diameter is about 3. Upon contact with sulphuric acid and hydrogen peroxide, a nickel sulphate solution N is formed having a residual amount of sulphuric acid $C_{SA, o}$ of about 7 g/L. The ratio of concentration of sulphuric acid in the effluent vs. the concentration of sulphuric acid in the feed solution is about 0.15. Due to the exothermic nature of the reaction, the temperature $T_o$ of the nickel sulphate solution N at the top of the column is about 98° C.

A first fraction $\varphi_1$ of the nickel sulphate solution N is cooled from a temperature of about 98° C. to a temperature of about 65° C., and subsequently mixed with the mixture of sulphuric acid A and hydrogen peroxide P in water. A second fraction $\varphi_2$ of said nickel sulphate solution N is further processed to a pH of about 3.5 and is subsequently processed to eliminate impurities. Gases which may have formed in the atmosphere at the top of the column reactor are treated in a scrubbing unit.

Example 2

An oxidative leach solution is prepared by mixing an aqueous sulphuric acid solution A with a hydrogen peroxide solution P in water. The mixture is subsequently heated to about $T_i=75°$ C. by mixing with a fraction $\varphi_1$ of the effluent of the column reactor. The column reactor has an internal diameter D and a height H, whereby the ratio H:D is about 2.6. Before mixing said fraction $\varphi_1$ with sulphuric acid and hydrogen peroxide, said fraction $\varphi_1$ is cooled from a temperature of about 98° C. to a temperature of about 75° C. The oxidative leach solution prepared accordingly has a temperature of about 75° C. and has a sulphuric acid content of about 31 g/L, and is fed via a feed section to the reaction zone of the column reactor.

The reaction zone comprises Ni metal cut cathodes having a dimension of about 50 mm by 50 mm and 13 mm thickness and having a nickel content of 99.97%. The metal particles containing nickel are intermittently fed on the support plate above the reactor feed section; metal particles feed omitted in FIG. 1. The Ni metal is provided in a bed, said bed having a bed volume characterized by a height and diameter, whereby the ratio of said height to said diameter is about 5. Upon contact with sulphuric acid and hydrogen peroxide, a nickel sulphate solution N is formed having a residual amount of sulphuric acid $C_{SA, o}$ of about 10 g/L. The ratio of concentration of sulphuric acid in the effluent vs. the concentration of sulphuric acid in the feed solution is about 0.32. Due to the exothermic nature of the reaction, the temperature $T_o$ of the nickel sulphate solution N at the top of the column is about 98° C.

A first fraction $\varphi_1$ of the nickel sulphate solution N is cooled from a temperature of about 98° C. to a temperature of about 75° C., and subsequently mixed with the mixture of sulphuric acid A and hydrogen peroxide P in water. A second fraction $\varphi_2$ of said nickel sulphate solution N is further processed to eliminate impurities. Gases which may have formed in the atmosphere at the top of the column reactor are treated in a scrubbing unit.

The invention claimed is:

1. A process for the preparation of a nickel sulphate solution (N) in a column reactor (R) by oxidative leaching of metal particles containing nickel, said process comprising the steps of:
   i. feeding metal particles containing nickel to a reaction section of said column reactor;
   ii. feeding an oxidative leach solution comprising sulphuric acid and hydrogen peroxide in water via a feed section to said reaction section, thereby contacting said oxidative leach solution with said metal particles containing nickel in said reaction section, thereby obtaining a nickel sulphate solution comprising a residual amount of sulphuric acid ($C_{SA,o}$); and
   iii. evacuating said nickel sulphate solution from said column reactor,
   whereby the ratio of the sulphuric acid concentration ($C_{SA,o}$) of said nickel sulphate solution obtained in step ii. to the sulphuric acid concentration ($C_{SA,i}$) of said oxidative leach solution is between 0.90 and 0.01,
   whereby said oxidative leach solution comprising sulphuric acid and hydrogen peroxide in water is fed in step ii. via a bottom section of said column reactor to said reaction section, and whereby said nickel sulphate solution is evacuated in step iii. via a top section of said column reactor from said reaction section.

2. The process according to claim 1, whereby the ratio of the sulphuric acid concentration ($C_{SA,o}$) of said nickel sulphate solution obtained in step ii. to the sulphuric acid concentration ($C_{SA,i}$) of said oxidative leach solution is between 0.70 and 0.02.

3. The process according to claim 1, whereby a liquid volume consisting of said oxidative leach solution in said column reactor has a diameter $D_L$ and a height $H_L$, whereby the ratio of said height to said diameter $H_L:D_L$ is between 1.0 and 10.0.

4. The process according to claim 1, whereby said oxidative leach solution is fed to said reactor at a temperature of 50° C. to 85° C.

5. The process according to claim 1, whereby said nickel sulphate solution is removed from said reactor at a temperature of 90° C. to 100° C.

6. The process according to claim 1, whereby a first fraction $\varphi_1$ of said nickel sulphate solution is cooled from a temperature above 90° C. to a temperature below 85° C., and whereby said fraction $\varphi_1$ is mixed with sulphuric acid and/or hydrogen peroxide to form an oxidative leach solution, prior to feeding said oxidative leach solution to said reactor.

7. The process according to claim 1, whereby a first fraction $\varphi_1$ of said nickel sulphate solution is mixed with sulphuric acid and/or hydrogen peroxide to form an oxidative leach solution, prior to feeding said oxidative leach solution to said reactor, whereby the volumetric ratio of said first fraction φ1 to the total volume of said nickel sulphate solution is between 0.70 and 0.95.

8. The process according to claim 6, whereby heat recovered from the cooling step of said first fraction $\varphi_1$ is, at least in part, used for heating the oxidative leach solution and/or the content of said reactor.

9. The process according to claim 1, whereby a second fraction $\varphi_2$ of said nickel sulphate solution is subjected to a purification step to reduce the concentration of one or more impurities in said second fraction $\varphi_2$, whereby said impurities comprise one or more selected from the list comprising Cu, Zn, Co, Mn, Fe, Al, F, C, Ca, Si, P, As, Cd, Sb and Mg.

10. The process according to claim 1, whereby said metal particles containing nickel comprise nickel in an amount of at least 96 wt. %, relative to the total weight of said metal particles.

11. The process according to claim 1, whereby said oxidative leach solution comprises sulphuric acid in an amount of 20 to 100 g/L.

12. The process according to claim 1, whereby said oxidative leach solution comprises hydrogen peroxide in an amount of 1.5 to 30 g/L.

13. The process according to claim 1, whereby hydrogen peroxide is present in the oxidative leach solution which is fed to the column reactor in a sub-stoichiometric amount relative to the amount of sulphuric acid present in said oxidative leach solution.

14. The process according to claim 1, whereby a gaseous atmosphere in the overflow section of said column reactor is circulated through a scrubber.

15. The process according to claim 1, whereby said oxidative leach solution is contacted with said metal particles at atmospheric pressure or at an under-pressure of less than 0.2 atm.

16. The process according to claim 1, whereby said column reactor is controlled to ensure that the nickel sulphate solution obtained from said column reactor has a residual sulphuric acid content ($C_{SA,o}$) of between 1 g/L and 20 g/L.

* * * * *